United States Patent
Chan et al.

(10) Patent No.: US 10,938,907 B2
(45) Date of Patent: *Mar. 2, 2021

(54) TECHNIQUES AND ARCHITECTURES FOR MANAGING DISPARATE HETEROGENEOUS CLOUD-BASED RESOURCES

(71) Applicant: salesforce.com, inc., San Francisco, CA (US)

(72) Inventors: Ka Hou Chan, Milpitas, CA (US); Karl Ryszard Skucha, Sunnyvale, CA (US); Kit Pang Szeto, Sunnyvale, CA (US); Emmanual Felipe Oliveira, San Francisco, CA (US); Jean-Marc Soumet, San Jose, CA (US); Simon Chan, Belmont, CA (US); Matvey Tovbin, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,752

(22) Filed: Nov. 4, 2019

(65) Prior Publication Data
US 2020/0068018 A1 Feb. 27, 2020

Related U.S. Application Data

(63) Continuation of application No. 15/721,575, filed on Sep. 29, 2017, now Pat. No. 10,469,584.
(Continued)

(51) Int. Cl.
*G06F 15/16* (2006.01)
*H04L 29/08* (2006.01)
(Continued)

(52) U.S. Cl.
CPC .......... *H04L 67/1097* (2013.01); *G06F 3/067* (2013.01); *G06F 16/183* (2019.01);
(Continued)

(58) Field of Classification Search
USPC ......................................................... 709/206
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

Notice of Allowance for U.S. Appl. No. 15/721,575 dated Aug. 6, 2019, 13 pages.

*Primary Examiner* — Quang N Nguyen
(74) *Attorney, Agent, or Firm* — Jaffery Watson Mendonsa & Hamilton LLP

(57) ABSTRACT

Techniques and architectures for data modeling and management. Data modeling services are provided to agents within multiple different operating environments of a computing environment having at least one database stored on one or more physical memory devices communicatively coupled with one or more hardware processors the one or physical memory devices. Building and versioning of data modeling projects is coordinated and data utilized for the data modeling projects with the one or more hardware processors.

15 Claims, 12 Drawing Sheets

Related U.S. Application Data

(60) Provisional application No. 62/402,948, filed on Sep. 30, 2016.

(51) Int. Cl.

| | | |
|---|---|---|
| *G06F 3/06* | (2006.01) | |
| *G06F 16/27* | (2019.01) | |
| *G06F 16/182* | (2019.01) | |
| *G06F 16/25* | (2019.01) | |
| *G06F 16/2453* | (2019.01) | |

(52) U.S. Cl.
CPC .......... *G06F 16/2453* (2019.01); *G06F 16/25* (2019.01); *G06F 16/27* (2019.01); *H04L 67/10* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,864,794 B2 * | 1/2018 | Cochrane ............... G06F 16/284 |
| 10,812,602 B2 * | 10/2020 | Kalaimalai ............. H04L 63/08 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0161840 A1 * | 10/2002 | Willcox ................. G06F 9/466 709/206 |
| 2002/0162090 A1 | 10/2002 | Parnell et al. |
| 2002/0165742 A1 | 11/2002 | Robins |
| 2002/0188625 A1 * | 12/2002 | Jans ......................... G06F 9/52 |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0228803 A1 * | 10/2005 | Farmer ................... G06Q 10/10 |
| 2009/0177744 A1 | 7/2009 | Marlow et al. |
| 2014/0067868 A1 * | 3/2014 | Kemmler ............... G06F 16/212 707/796 |
| 2015/0006732 A1 * | 1/2015 | Schmidt ................ H04L 47/726 709/226 |
| 2020/0195517 A1 * | 6/2020 | Manthena ............... H04L 43/16 |
| 2020/0328948 A1 * | 10/2020 | Nayyar ................ H04L 41/0803 |

* cited by examiner

TECHNIQUES AND ARCHITECTURES FOR MANAGING DISPARATE HETEROGENEOUS CLOUD-BASED RESOURCES

CLAIM OF PRIORITY

This continuation application claims the benefit of U.S. application Ser. No. 15/721,575 entitled "TECHNIQUES AND ARCHITECTURES FOR MANAGING DISPARATE HETEROGENEOUS CLOUD-BASED RESOURCES," filed Sep. 29, 2017, now U.S. Pat. No. 10,469,584, with an issue date of Nov. 5, 2019, which claims the benefit of U.S. Provisional Patent Application No. 62/402,948 entitled "METHODS AND SYSTEMS FOR MULTI-CLOUD, MULTI-TENANT, MULTI-ENVIRONMENT AND MULTI-ENGINE MACHINE LEARNING PLATFORM," filed Sep. 30, 2016, the entire contents of which are incorporated herein by reference.

TECHNICAL FIELD

Embodiments relate to techniques for managing cloud-based resources. More particularly, embodiments relate to techniques for managing and/or tracking resources from disparate heterogeneous cloud environments.

BACKGROUND

As cloud-based resources and environments are increasingly used, users may often concurrently utilize different sets of cloud-based resources (aka, different clouds). In some situations, these clouds may be provided by the same corporate entity. For example, salesforce.com can provide services through Commerce Cloud, Sales Cloud, Service Cloud, etc. However, this use of disparate heterogeneous clouds can result in inefficiencies.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Figure 1:
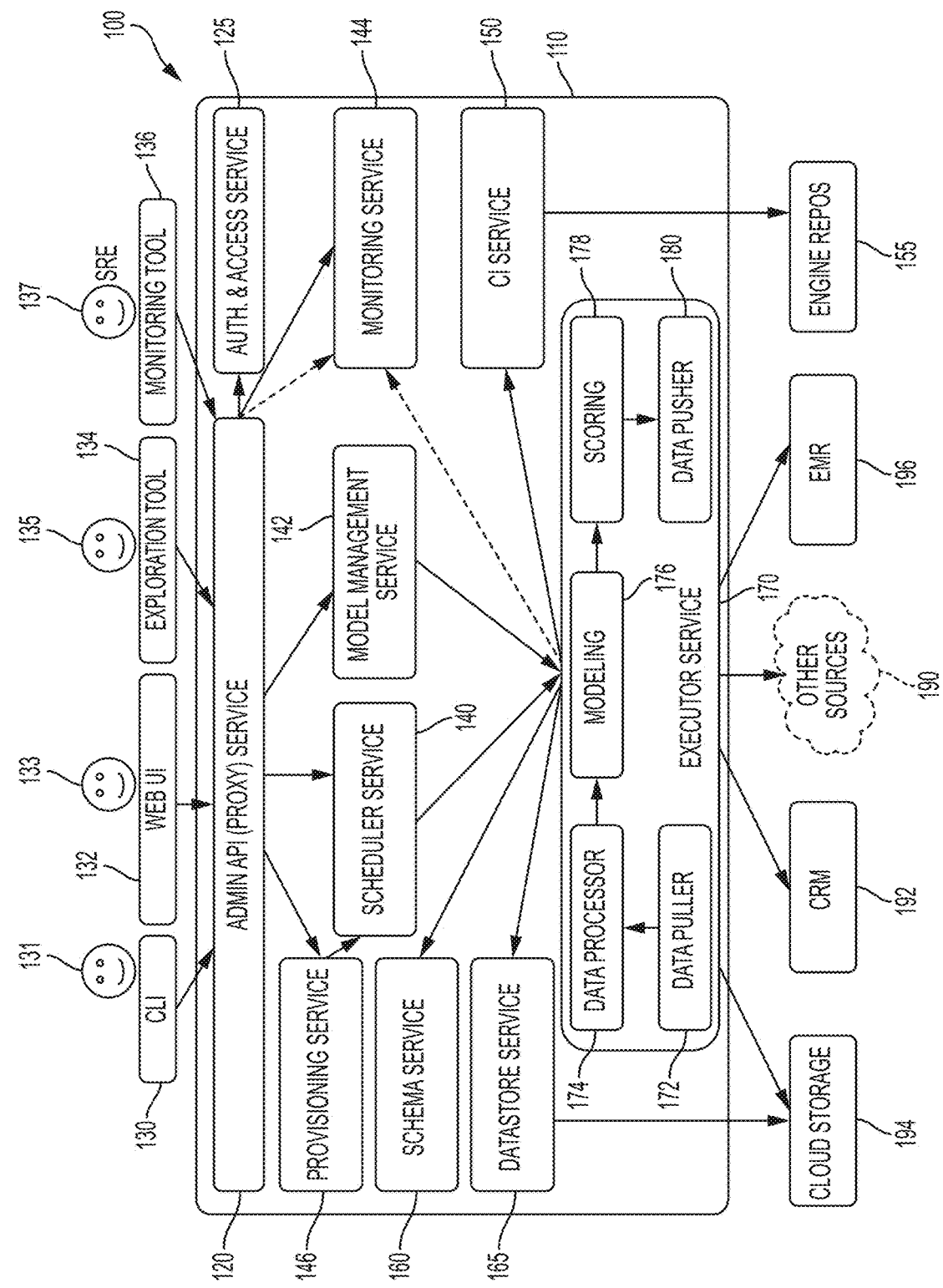
FIG. 1 is a block diagram of one embodiment of a platform architecture that can provide the services and advantages described herein.

FIG. 1 is a block diagram of one embodiment of a platform architecture that can provide the services and advantages described herein. The architecture of FIG. 1 can, for example, provide access to multiple resources from multiple cloud-based providers to a variety of users utilizing different tools to access the resources.

In one embodiment, architecture 100 utilizes orchestration service/platform 110 to manage the various services and/or versions provided by architecture 100. Orchestration service/platform 110 can be based on, for example, Elastic Beanstalk available from Amazon Web Services (AWS). In one embodiment, orchestration service/platform 110 a single application program interface (API) for multiple types of users and tools attempting to access the resources provided, for example, administration (admin) API service 120. In one embodiment, Admin API Service 120 can utilize authentication and access service 125 to authenticate users prior to granting access to one or more resources provided via architecture 100.

As discussed above, various interfaces and/or types of devices can be used to access the resources of architecture 100. In the example of FIG. 1, user 131 (e.g., software engineer) can utilize command line interface (CLI) 130 to communicate with architecture 100 via admin API service 120. User 133 (e.g., the manager of user 131) can use browser (e.g. Web UI) interface 132 to communicate with architecture 100 via admin API service 120.

Other users, having different roles and/or types of client devices can also be used to access the resources of architecture 100. For example, user 135 (e.g., a data scientist) can utilize exploration tool 134 to communicate with architecture 100 via admin API service 120. As another example, user 137 (e.g., a site reliability engineer) can utilize monitoring tool 136 to communicate with architecture 100 via admin API service 120.

In one embodiment, admin API service 120 provides an interface to scheduler service 140, which operates to schedule tasks to provide the services of architecture 100. In one embodiment, admin API service 120 provides an interface to monitoring service 144, which operates to provide monitoring of the services of architecture 100. In one embodiment, model management service 142 operates to manage model creation and usage through admin API service 120.

Use of modeling is discussed in greater detail below. In one embodiment, admin API service 120 also operates with provisioning service 146 (which is also coupled with scheduler service 140) to schedule and provision resources within architecture 100. In one embodiment, the modeling process includes 1) model training, which can be scheduled batch learning and/or real time learning; 2) scoring, which can be scheduled batch scoring and/or real time scoring; and 3) evaluation, which can be manually-triggered offline evaluation and/or real time evaluation.

In one embodiment, constant integration (CI) service 150 operates to manage versions of one or more services, models and/or resources. In one embodiment, CI service 150 utilizes one or more repositories 155 to manage services, models and/or resources within architecture 100. Repository 150 can be, for example, a Git repository or similar.

In one embodiment, architecture 100 can also include schema service 160 that operates to manage one or more database schemas within the environment. In one embodiment, architecture 100 can include datastore service 165 that manages data storage resources, for example, databases.

In one embodiment, executor service 170 includes data puller 172, data processor 174, modeling agent 176, scoring agent 178 and data pusher 180. In one embodiment, executor service 170 provides an interface between architecture 100 and resources external to architecture 100. These external resources can include, for example, cloud storage service 194 (e.g., Amazon Simple Storage Service, S3), customer relationship management service 192 (e.g., salesforce), cluster computing service 196 (e.g., Spark). Other services 190 can also be accessed via executor service 170.

Various functions and interactions of the components of executor service 170 are described in greater detail below. In general, data puller 172 operates to periodically pull data from one or more sources to be utilized for acquiring data to be utilized by executor service 170. The data can be used for modeling purposes, for example. In one embodiment, data processor 174 operates to process data from data puller 172 to be utilized by executor service 170. The data can be used for modeling purposes, for example.

In one embodiment, modeling agent 176 can utilize data from data processor 174 to generate, update, modify, delete and/or otherwise manage models to be used by executor service 170. In one embodiment, scoring agent 178 works with one or more models from modeling agent 176 to provide a scoring functionality that can be used by executor service 170. In one embodiment, data pusher 180 pushes data to one or more targets, which can be the same or different or overlap with, the sources of data utilized by data puller 172.

Figure 2:
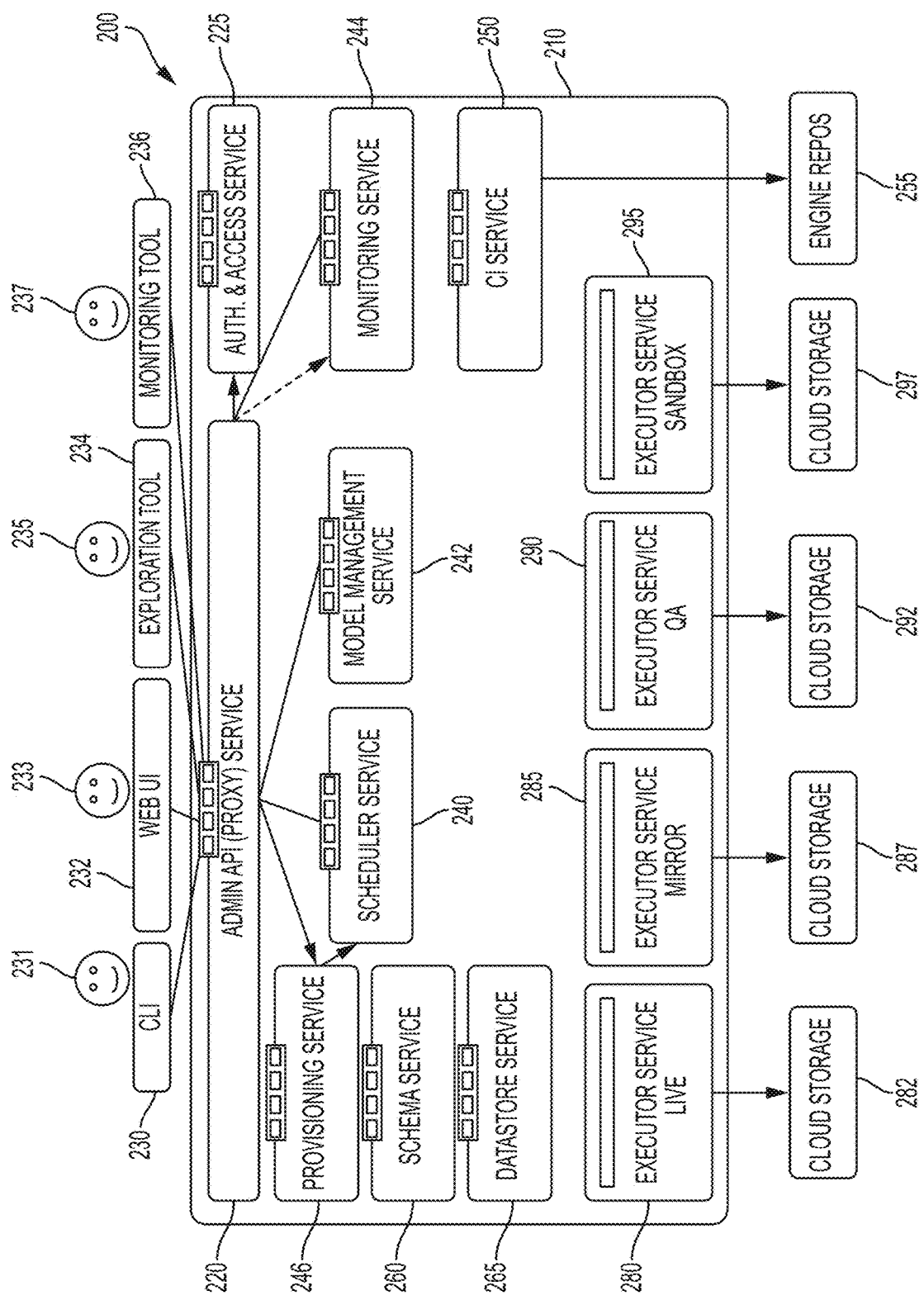
FIG. 2 is a block diagram of one embodiment of a multi-environment platform architecture that can provide the services and advantages described herein.

FIG. 2 is a block diagram of one embodiment of a multi-environment platform architecture that can provide the services and advantages described herein. The architecture of FIG. 2 can, for example, provide access to multiple resources within multiple environments from multiple cloud-based providers to a variety of users utilizing different tools to access the resources. The example of FIG. 2 includes multiple environments (e.g., live/production, mirror/backup, testing/quality assurance, development/sandbox). These environments are examples and additional and/or different environments can also be supported.

In one embodiment, architecture 200 utilizes orchestration service/platform 210 to manage the various services and/or versions provided by architecture 200. Orchestration service/platform 210 can be based on, for example, Elastic Beanstalk available from Amazon Web Services (AWS). In one embodiment, orchestration service/platform 210 a single application program interface (API) for multiple types of users and tools attempting to access the resources provided, for example, administration (admin) API service 220. In one embodiment, admin API service 200 provides an interface to multiple environments within architecture 200. In one embodiment, Admin API Service 220 can utilize authentication and access service 225 to authenticate users prior to granting access to one or more resources provided via architecture 200.

As discussed above, various interfaces and/or types of devices can be used to access the resources of architecture 200. In the example of FIG. 2, user 231 (e.g., software engineer) can utilize command line interface (CLI) 230 to communicate with architecture 200 via admin API service 220. User 233 (e.g., the manager of user 231) can use browser (e.g. Web UI) interface 232 to communicate with architecture 200 via admin API service 220.

Other users, having different roles and/or types of client devices can also be used to access the resources of architecture 200. For example, user 235 (e.g., a data scientist) can utilize exploration tool 234 to communicate with architecture 200 via admin API service 220. As another example, user 237 (e.g., a site reliability engineer) can utilize monitoring tool 236 to communicate with architecture 200 via admin API service 220.

In one embodiment, admin API service 220 provides an interface to scheduler service 240, which operates to schedule tasks to provide the services of architecture 200. In one embodiment, admin API service 220 provides an interface to monitoring service 244, which operates to provide monitoring of the services of architecture 200. In one embodiment, model management service 242 operates to manage model creation and usage through admin API service 220. Use of modeling is discussed in greater detail below. In one embodiment, admin API service 220 also operates with provisioning service 246 (which is also coupled with scheduler service 240) to schedule and provision resources within architecture 200.

In one embodiment, constant integration (CI) service 250 operates to manage versions of one or more services, models and/or resources. In one embodiment, CI service 250 utilizes one or more repositories 255 to manage services, models and/or resources within architecture 200. Repository 250 can be, for example, a Git repository or similar.

In one embodiment, architecture 200 can also include schema service 260 that operates to manage one or more database schemas within the environment. In one embodiment, architecture 200 can include datastore service 265 that manages data storage resources, for example, databases.

In one embodiment, each of the services/agents discussed above with respect to FIG. 2 can provide services for each of the environments supported by architecture 200. In one embodiment, architecture 200 includes executor service live 280, executor service mirror 285, executor service QA 290 and executor service sandbox 295. In one embodiment, executor service live 280 provides the services described above with respect to executor service 170 for production environments supported by architecture 200. In one embodiment, executor service live 280 utilizes cloud storage service 282 for data storage used for modeling and other services provided by executor service live 280.

In one embodiment, executor service mirror 285 provides the services described above with respect to executor service 170 for mirrored environments supported by architecture 200. In one embodiment, executor service mirror 285 utilizes cloud storage service 287 for data storage used for modeling and other services provided by executor service mirror 285. In one embodiment, executor service QA 290 provides the services described above with respect to executor service 170 for quality assurance (testing) environments supported by architecture 200. In one embodiment, executor service QA 290 utilizes cloud storage service 292 for data storage used for modeling and other services provided by executor service live 290.

In one embodiment, executor service sandbox 295 provides the services described above with respect to executor service 170 for development (or otherwise isolated) environments supported by architecture 200. In one embodiment, executor service sandbox 295 utilizes cloud storage service 297 for data storage used for modeling and other services provided by executor service sandbox 295.

Figure 3:
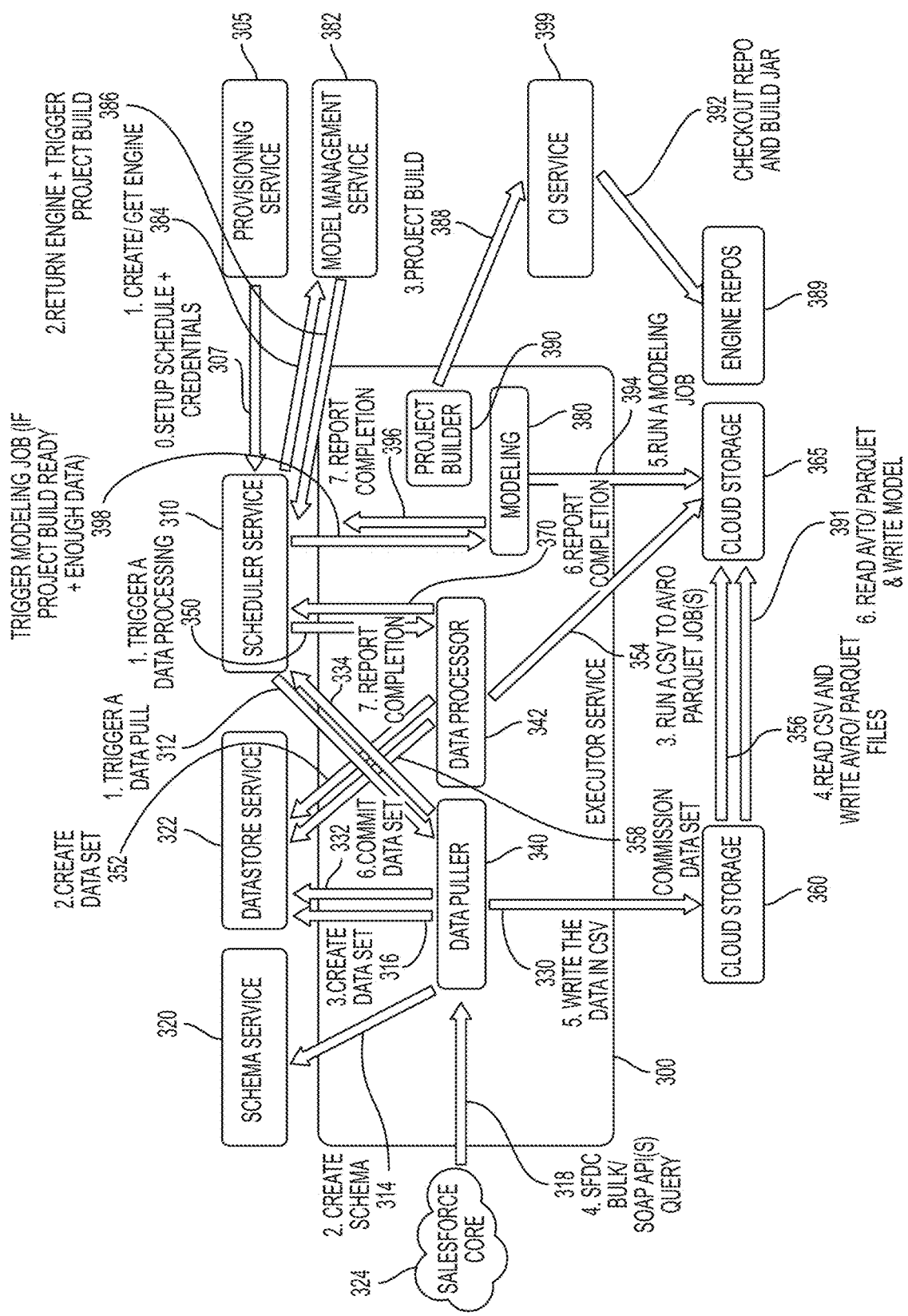
FIG. 3 is a data flow diagram of one embodiment of an executor service.

FIG. 3 is a data flow diagram of one embodiment of an executor service. The example embodiment of FIG. 3 provides an executor service that operates as an interface between multiple platform services and/or agents and multiple external clouds (e.g., external disparate heterogeneous clouds). In one embodiment, the executor service of FIG. 3 can exist within an on-demand services environment, embodiments of which are described in greater detail below.

In one embodiment, provisioning service 305 can set up a schedule (307) for the various functions that follow with scheduler service 310. In one embodiment, the setup process can include checking and/or managing of credentials to make sure that the work to be done has been authorized.

In one embodiment, scheduler service 310 triggers a data pull (312) by sending a message or indication to data puller 340. In one embodiment, in response to receiving the indication from scheduler service 310, data puller 340 can create a schema (314) for (or with) schema service 320. Also in response to receiving the indication from scheduler service 310, data puller 340 can create a data set (316) for (or with) datastore service 322.

Data puller 340 can receive data (318) from an external data source (e.g., salesforce) that has data to be analyzed/modeled/filtered. The data can be received, for example, as the result of one or more database queries. In one embodiment, in response to receiving the data, data puller 340 can format the data (if necessary) and cause the data to be stored in cloud storage service 360. In one embodiment, after (or in parallel with) the data being stored in cloud storage service 360, data puller 340 can cause the data set to be committed (332) in datastore service 322. In one embodiment, once the desired data has been acquired and stored, completion of the data pull is reported (334) to scheduler service 310.

In one embodiment, scheduler service 310 triggers data processing (350) by sending a message or indication to data processor 342. Also in response to receiving the indication from scheduler service 310, data processor 342 can create a data set (352) for (or with) datastore service 322. In one embodiment, data processor 342 can run a search job 354 on data stored in cloud storage 365. In one embodiment, data stored in cloud storage 360 in one format can be copied/moved to cloud storage 365 and stored in a different format 356.

In one embodiment, after (or in parallel with) the data being read from cloud storage service 365, data processor 342 can cause the data set to be committed (358) in datastore service 322. In one embodiment, once the desired data has been acquired, stored and/or processed, completion of the data processing is reported (370) to scheduler service 310.

In one embodiment, scheduler service 310 can cause model management service 382 to create one or more model engines 384. In alternate embodiments, scheduler service 310 can get one or more model engines (384) from model management service 382. In one embodiment, model management service 382 returns the requested engine(s) 386, and can trigger a project build through scheduler service 310.

In one embodiment, triggering a project build causes project builder 390 to initiate building of the project (388) utilizing constant integration (CI) service 399 that tracks project components using repository 389. In one embodiment, CI service 399 checks the appropriate files out from repository 389 to build the project.

In one embodiment, when the project build is ready and sufficient data has been gathered, a modeling job can be triggered (398) by scheduler service 310 and performed by modeling agent 380. The modeling job can be run (394) by modeling agent 380 utilizing cloud storage 365. When the modeling job has been completed, modeling agent 380 can report completion (396) to scheduler service 310.

Figure 4:
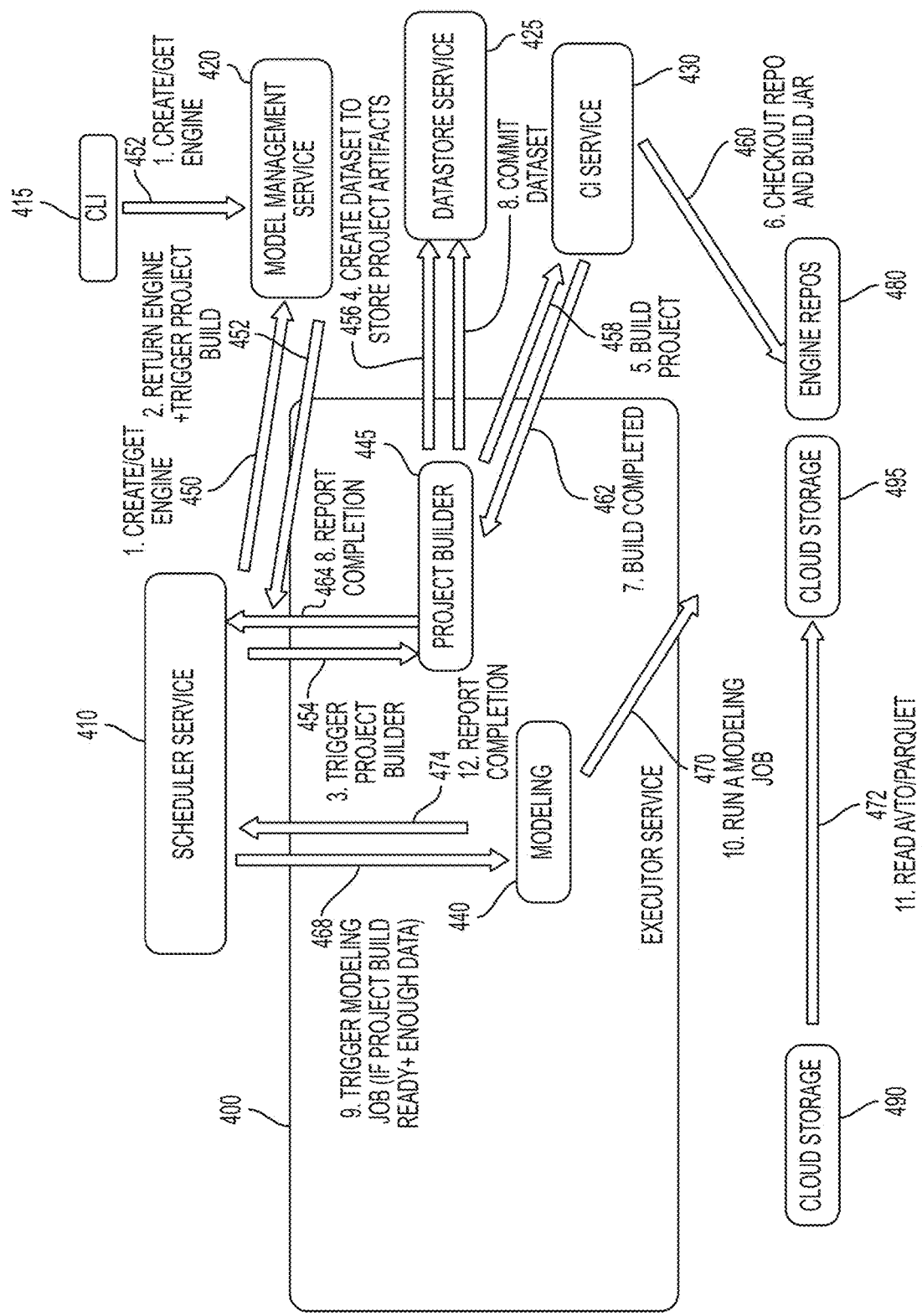
FIG. 4 is a data flow diagram of one embodiment of model management functionality that can be provided by an executor service.

FIG. 4 is a data flow diagram of one embodiment of model management functionality that can be provided by an executor service. The example embodiment of FIG. 4 provides an executor service that can build a project and train a model to be used with data corresponding to external disparate heterogeneous clouds. In one embodiment, the executor service of FIG. 4 can exist within an on-demand services environment, embodiments of which are described in greater detail below.

Creation (or getting) of an engine can be triggered by scheduler service 410 (450) and/or by a user via an interface (e.g., CLI 415). In response, model management service 420 can return the requested engine and trigger a project build (452). Project scheduler 410 can then trigger (454) project builder 445 to build the project.

In one embodiment, project builder 445 can create a data set to store the project artifacts (456) in datastore service 425. Project builder 445 can build the project (458) using CI service 430, that tracks project components using repository 480. In one embodiment, CI service 430 checks the appropriate files out from repository 480 to build the project. When the build is completed, CI service 430 notifies project builder 445 that the build has been completed (462). Project builder 445 can then notify (464) scheduler service 410 of the completion.

In one embodiment, scheduler service 410 triggers a modeling job if the project build is ready and enough data is available (468). Modeling agent 440 can then run the modeling job (470) using data from cloud storage 495. In one embodiment, cloud storage 495 receives data (and possibly reformats the data) from cloud storage service 490. When the modeling job has been completed, modeling agent 440 reports completion (474) to scheduler service 410.

In some embodiments, the functionality described above can be provided within a multitenant environment. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Within a multitenant environment, a tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Each tenant can include one or more organizations (orgs) that have varying scope within the host tenant structure. Multi-tenancy contrasts with multi-instance architectures, where separate software instances operate on behalf of different tenants.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

Figure 5:
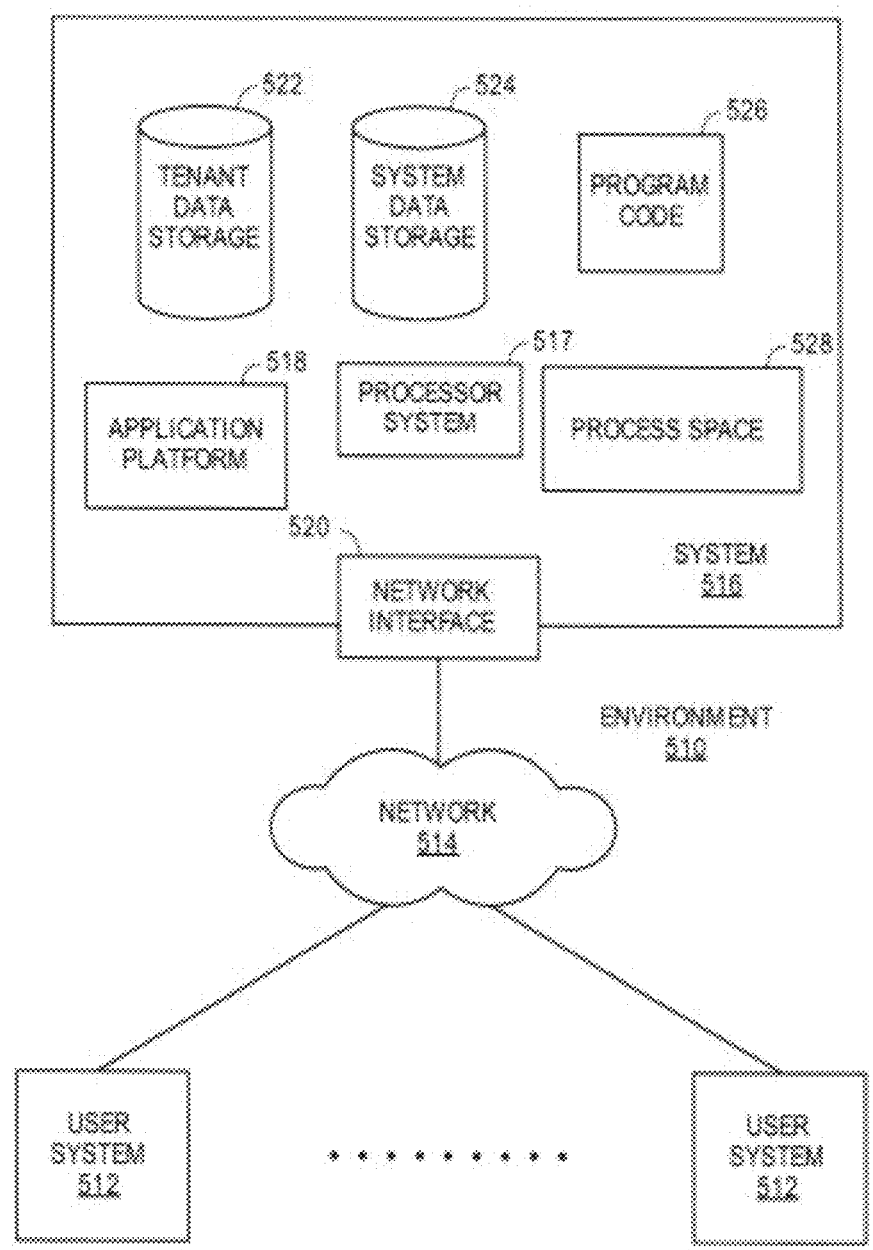
FIG. 5 illustrates a block diagram of an environment where an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Core series processor or the like. Similarly, system 516 (and additional instances of an MTS, where more than one is present) and all of their components might be operator configurable using application(s) including computer code to run using a central processing unit such as processor system 517, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
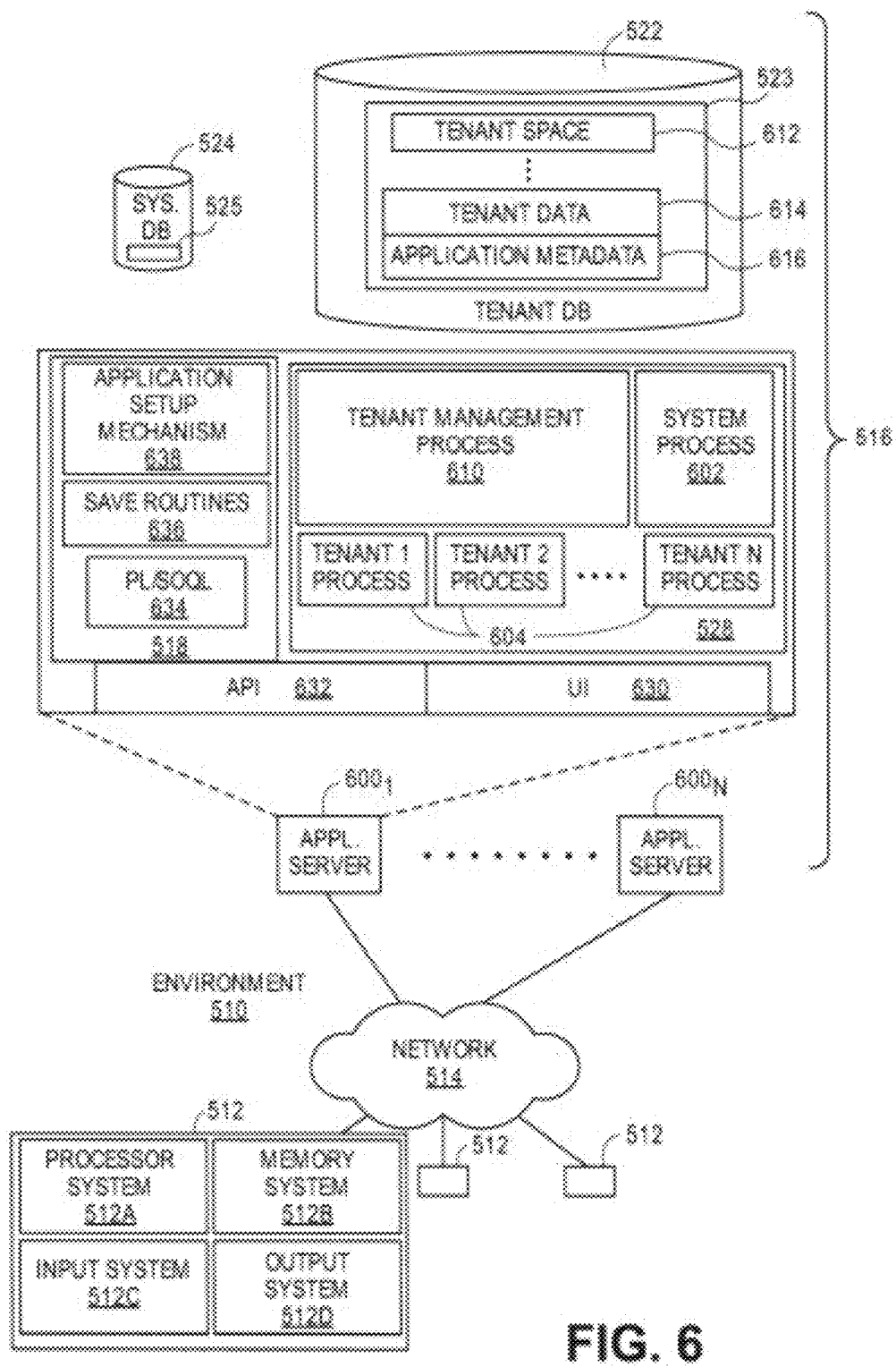
FIG. 6 illustrates a block diagram of an environment where an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers 600₁-600ₙ, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 BIG-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7:
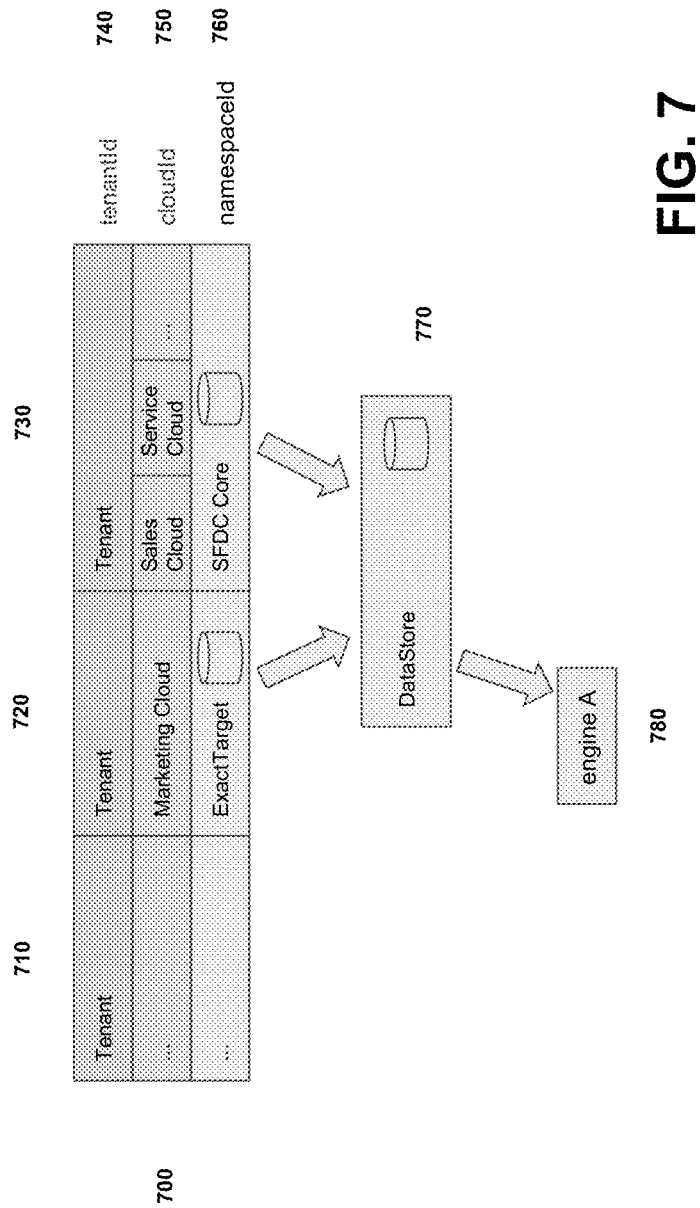
FIG. 7 is a block diagram illustrating a namespace concept that can be utilized to support various elements of the functionality described herein.

FIG. 7 is a block diagram illustrating a namespace concept that can be utilized to support various elements of the functionality described herein. Depending on the cloud service structure, multiple clouds can share the same namespace data objects. For example, Sales Cloud from salesforce.com and Service Cloud from salesforce.com both utilize the same namespace data objects, but can be considered different clouds. It would be inefficient to pull the same data for different clouds.

In one embodiment, instead of identifying data by cloud, the data can be identified by namespace. Table 700 graphically illustrates how multiple tenants (710, 720, 730) can have access to different cloud services (e.g., Marketing Cloud, Sales Cloud, Service Cloud). Each tenant has a tenant identifier (740) and can be associated with various clouds (750).

Table 700 further conceptually illustrates how multiple clouds can be based on a single namespace identifier (760), which can be used instead of the cloud identifier by the datastore service 770. In the example of FIG. 7, engine A (780) can use the namespace identifiers from datastore 770 to provide the functionality described above. Thus, the resulting service is more efficient than utilizing previous techniques.

Figure 8:
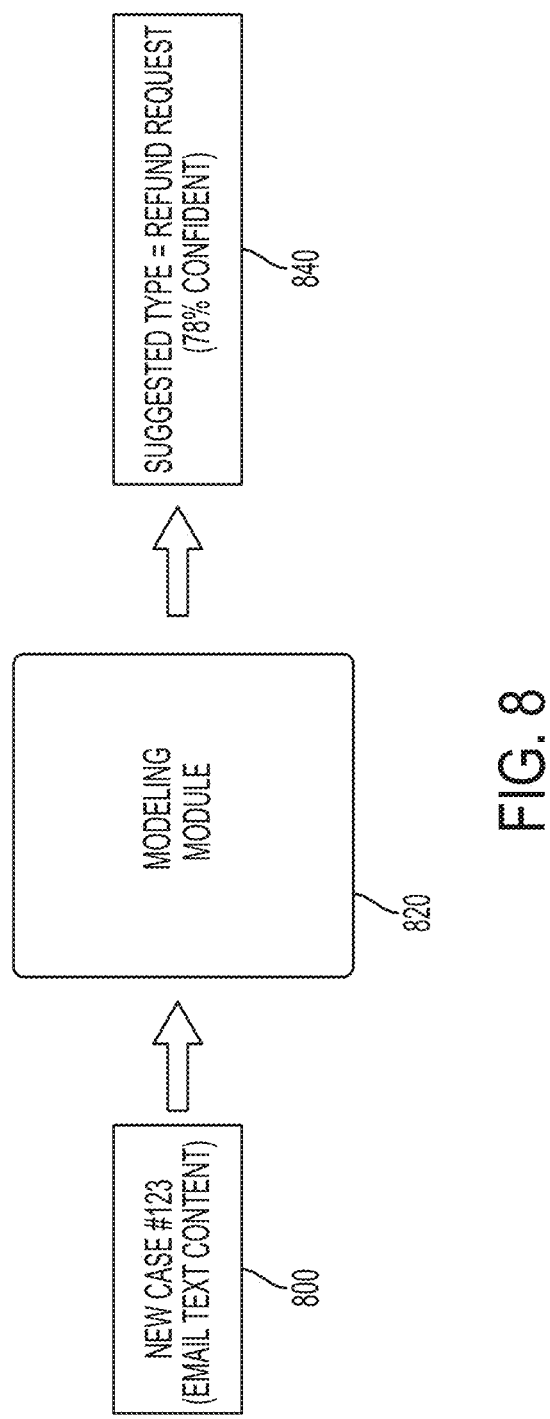
FIG. 8 is a conceptual illustration of on-demand scoring for a case classification.

FIG. 8 is a conceptual illustration of on-demand scoring for a case classification. In the example of FIG. 8, a new case to be classified (800) is received. The case can be based on an email, for example. For example, a ride sharing entity may receive an email submitted via a web page and the modeling functionality described herein can be utilized to classify the email prior to analysis by a human. Other applications can also be supported as this is just one simple example.

In one embodiment, the new case is provided to modeling module 820 to be analyzed using the available models. These models can use various characteristics of the case (e.g., language style, words used, source, time of day, length) to determine a resulting class type. In one embodiment, a confidence value is also determined (e.g., 97% confident the class is correct, 50% confident the class is correct). In the example of FIG. 8, modeling module 820 has determined that the new case is a refund request with 78% confidence.

Figure 9:
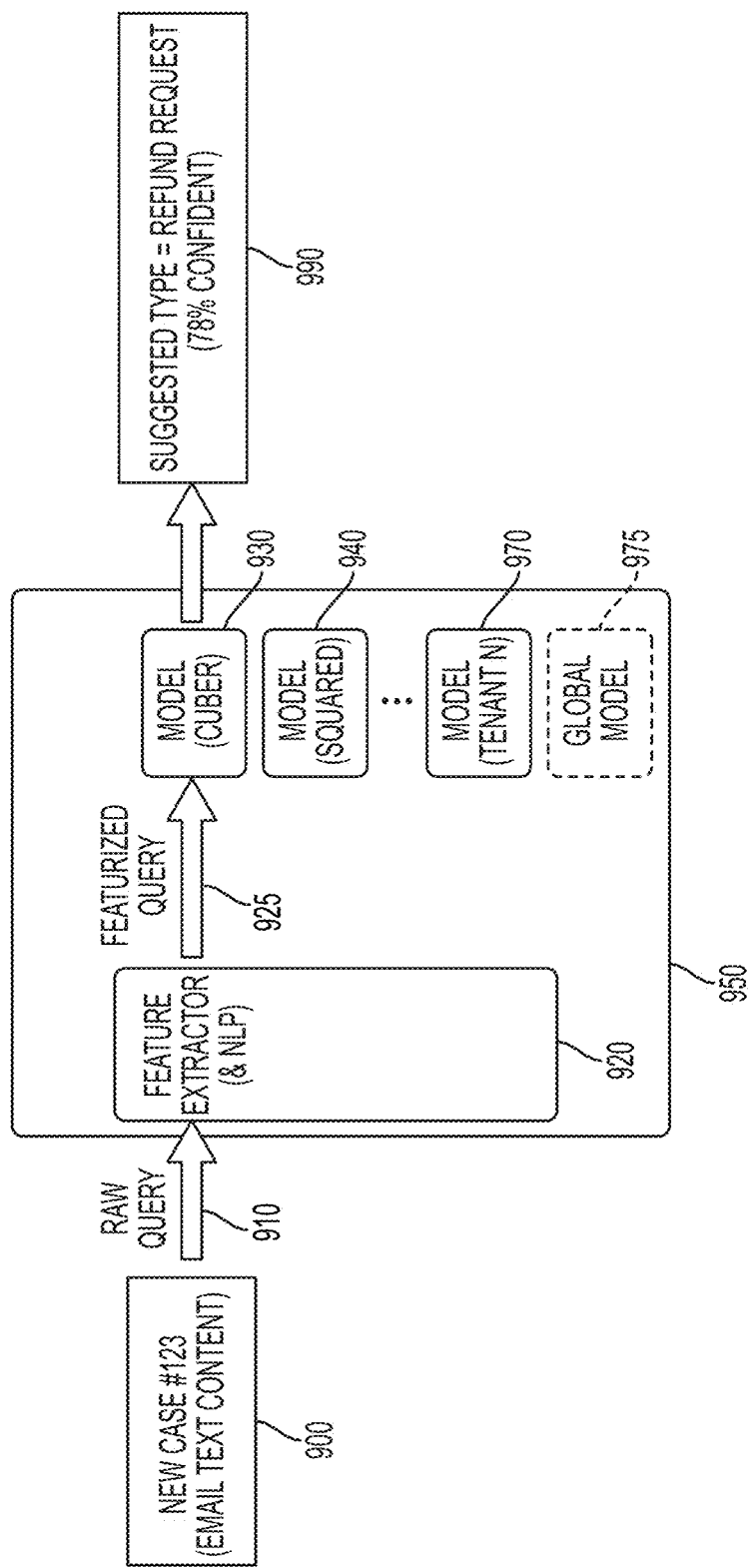
FIG. 9 is a conceptual illustration of on-demand scoring using multiple components.

FIG. 9 is a conceptual illustration of on-demand scoring using multiple components. In the example of FIG. 9, a new case to be classified (900) is received. The case can be based on an email, for example. For example, a ride sharing entity may receive an email submitted via a web page and the modeling functionality described herein can be utilized to classify the email prior to analysis by a human. Other applications can also be supported as this is just one simple example.

In one embodiment, raw query 910 is generated from new case 900 and sent to modeling module 950. In one embodiment, modeling module 950 includes feature extractor 920 that analyzes raw query 910 to extract one or more features. The extracted features are utilized to generate featurized query 925 that can be provided to one or more models (e.g., 930, 940, 970, 975).

The models can use various characteristics of the case (e.g., language style, words used, source, time of day, length) to determine a resulting class type. In one embodiment, a confidence value is also determined (e.g., 97% confident the class is correct, 50% confident the class is correct). In the example of FIG. 9, modeling module 950 has determined that the new case is a refund request with 78% confidence.

Figure 10:
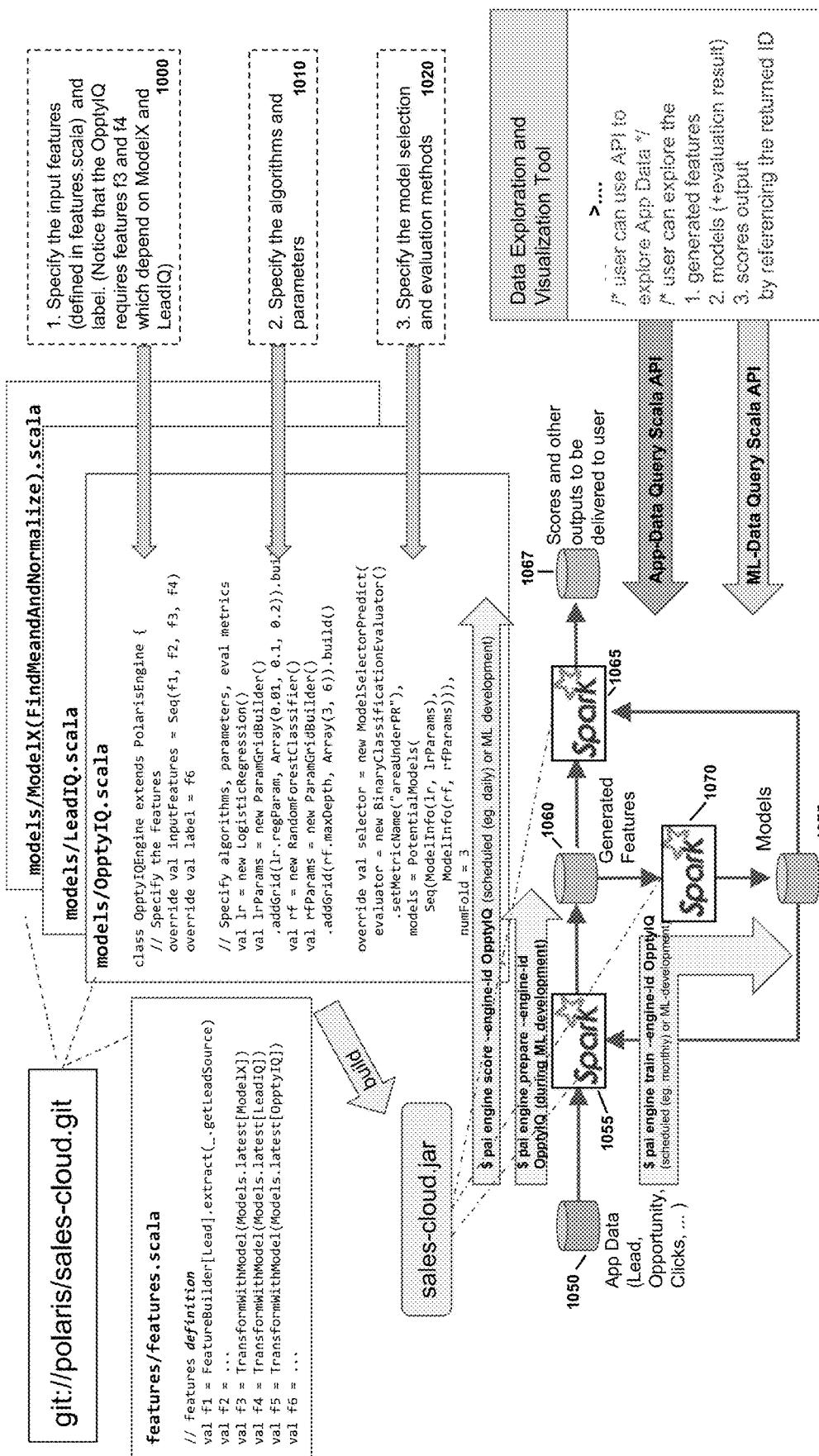
FIG. 10 is a conceptual illustration of a programmatic architecture that can be utilized for using models as described herein.

FIG. 10 is a conceptual illustration of a programmatic architecture that can be utilized for using models as described herein. The example of FIG. 10 illustrates specific example code and file types; however, the concepts described herein are not limited to these specifics.

In one embodiment, a programmer/engineer can specify input features and/or labels, 1000. This can be accomplished using, for example, an object-oriented programming language (e.g., Scala) via one or more files. In one embodiment, the programmer/engineer can specify algorithms and/or parameters to be used in the modeling process, 1010. This can be accomplished in the same file (as illustrated) or via additional files. In one embodiment, the programmer/engineer can further specify selection and/or evaluation methods, 1020. Similarly, this can be accomplished in the same file (as illustrated) or via additional files.

In one embodiment, data from an application (or other source) can be loaded from database 1050 to computing platform 1060 (e.g., Apache Spark) that can operate to determine one or more features from the data to be stored in database 1060. In one embodiment, the features from database 1060 can be analyzed by computing platform 1070 to generate one or more models to be stored in database 1075. In one embodiment, computing platform 1065 uses the features from database 1060 and the models from database 1075 to generate scores and other analytical results to be delivered to a user, which can be stored in database 1067.

Figure 11:
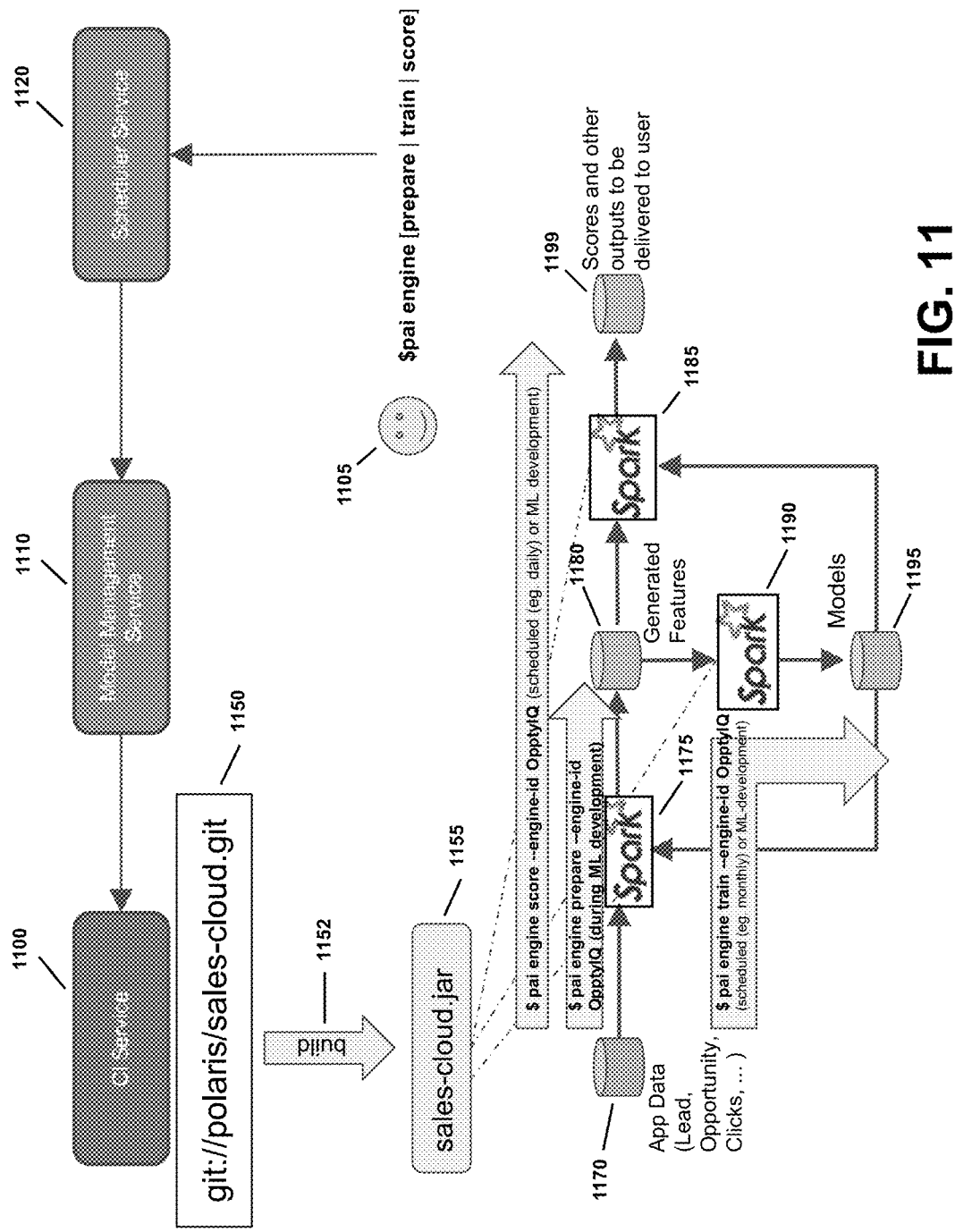
FIG. 11 is a conceptual illustration of one embodiment of the programmatic architecture of FIG. 10 within an environment of FIG. 1 or 2.

FIG. 11 is a conceptual illustration of one embodiment of the programmatic architecture of FIG. 10 within an environment of FIG. 1 or 2. In one embodiment, scheduler service 1120 operates as described above and can respond to input signal generated by user 1105 via any type of user interface. Scheduler service 1120 can operate as described above to work with model management service 110.

In one embodiment, CI service 1100 can manage project files and control building of projects, 1150, 1152. In one embodiment, the resulting file (1155) can be used by one or more computing platforms (e.g., 1175, 1185, 1190) to acquire and analyze data (e.g., from database 1170) to identify or extract features (1180) to generate or modify models (1195) that can be used for modeling to provide scores and other analysis (1199) that can be delivered to a user (e.g., user 1105).

Figure 12:
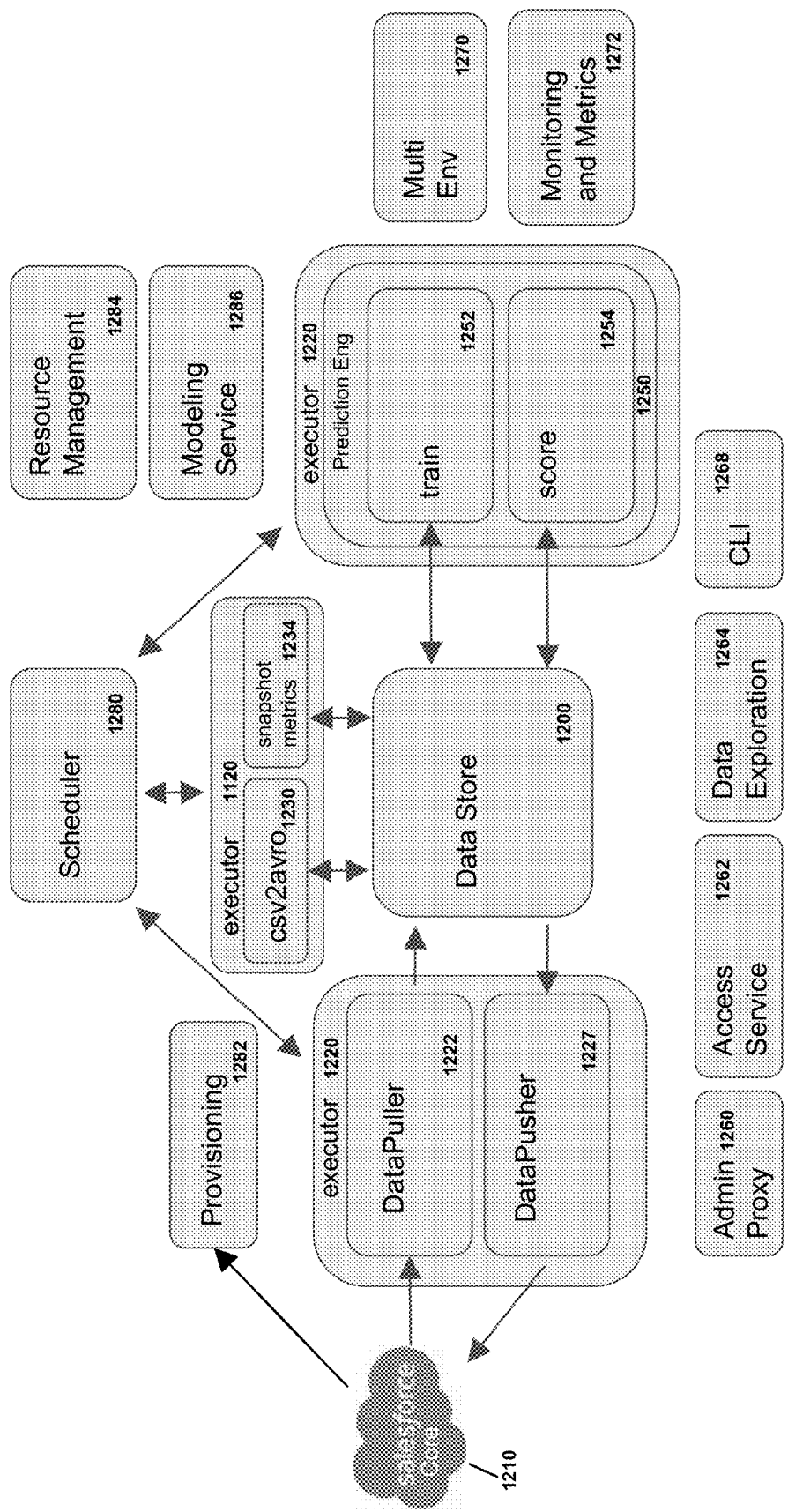
FIG. 12 is a block diagram of a data storage architecture that can support the functionality as described herein.

FIG. 12 is a block diagram of a data storage architecture that can support the functionality as described herein. The data store of FIG. 12 can be utilized by any number of executor services, for example, to provide data to a data puller, to store model files, etc.

In one embodiment, data store 1200 can be a database system that provides storage functionality for multiple stages of the modeling process described herein. In one embodiment, data source 1210 can be any environment in which data to be modeled resides. For example, data source 1210 can be an on-demand services environment that stores tenant data for multiple tenants concurrently. Data source 1210 can be, for example, one of the cloud services provided by salesforce.com. Any user data (e.g., lead information, opportunity information, click rates, performance information).

In one embodiment, executor 1220 includes at least data puller 1222 and data pusher 1227. Data puller 1222 can operate to pull selected data from data source 1210 to be used by executor 1220 and/or other components. Similarly, data pusher 1227 can operate to push selected data to data source 1210 from executor 1220. In one embodiment, executor 1220 can also include one or more conversion agents (e.g., CSV2Avro 1230) that can function to convert data formats for use by different services. In one embodiment, snapshot metrics agent 1234 can function to monitor one or more service and/or resources to determine performance metrics or other factors.

In one embodiment, executor 1220 further includes prediction engine 1250, which can include components for generating, maintaining and utilizing models to generate predictions based on data pulled from data source 1210. In one embodiment, prediction engine 1250 includes at least training agent 1252 and scoring agent 1254. Training agent 1252 operates to perform training using models developed and managed as described herein. Similarly, scoring agent 1254 uses the trained models to generate scores based on data from data source 1210.

In one embodiment, provisioning agent 1282 operates with data puller 1222 and data pusher 1227 to manage the flow of data between executor 1220 and data source 1210. In one embodiment, scheduler 1280 operates with executor 1220 to orchestrate the generation, updating, management, utilization and/or lifecycle management of the modeling techniques described herein. In one embodiment, resource management agent 1284 and modeling service agent 1286 operate to manage the usage of models by executor 1220.

As discussed above, the environment can be accessed via one or more of several types of interfaces (e.g., Admin Proxy 1260, Access Service 1262, Data Exploration tool 1264 and/or CLI 1268). In one embodiment, the components of FIG. 12 can provide functionality to/with multiple environment types (e.g., production, test, mirror) 1270. Further, monitoring tools and/or monitoring metrics 1272 can also be supported/implemented with the components of FIG. 12.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
 a computing environment having at least one database stored on one or more physical memory devices;
 one or more hardware processors communicatively coupled with the one or physical memory devices, the one or more hardware processors configured to provide:
 a namespace comprising namespace objects, each associated with one of multiple cloud environments and a single namespace identifier for the namespace objects;
 data for multiple different operating environments that is managed by the namespace and is used to generate one or more data modeling projects;
 data modeling services to agents within the multiple different operating environments, the data modeling services comprising coordinating building and versioning of the one or more data modeling projects utilizing the data managed by the namespace; and
 wherein the multiple different operating environments comprise one or more databases systems that provide on-demand database service to client entities, the on-demand database service being at least in part shaped by the one or more data modeling projects.

2. The system of claim 1 wherein data to be used for training is stored externally to the computing environment.

3. The system of claim 1 wherein the multiple different operating environments function within a system that provides a multitenant database that stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

4. The system of claim 1 wherein at least one of the data modeling projects provides at least a suggested classification with associated degree of confidence.

5. The system of claim 1 wherein the data modeling services function on data acquired from disparate heterogeneous cloud sources.

6. A method for data modeling and management, the method comprising:
 providing data modeling services to agents within multiple different operating environments of a computing environment having at least one database stored on one or more physical memory devices communicatively coupled with one or more hardware processors and the one or physical memory devices; and
 coordinating building and versioning of data modeling projects and data utilized for the data modeling projects with the one or more hardware processors;
 wherein the multiple different operating environments comprise at least a hosted database provided by an entity separate from client entities, and provide on-demand database service to the client entities;

wherein tenant data is managed with namespace objects having a single namespace identifier for multiple cloud environments having different cloud identifiers.

7. The method of claim 6 wherein data to be used for training is stored externally to the computing environment.

8. The method of claim 6 wherein the multiple different operating environments function within a system that provides a multitenant database that stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

9. The method of claim 6 wherein at least one of the data modeling projects provides at least a suggested classification with associated degree of confidence.

10. The method of claim 6 wherein the data modeling services function on data acquired from disparate heterogeneous cloud sources.

11. A non-transitory computer-readable medium having stored thereon instructions for data modeling and management, the instructions, when executed by one or more processors, are configurable to cause the one or more processors to:
provide data modeling services to agents within multiple different operating environments of a computing environment having at least one database stored on one or more physical memory devices communicatively coupled with one or more hardware processors and the one or physical memory devices; and
coordinate building and versioning of data modeling projects and data utilized for the data modeling projects with the one or more hardware processors;
wherein the multiple different operating environments comprise at least a hosted database provided by an entity separate from client entities, and provide on-demand database service to the client entities;
wherein tenant data is managed with namespace objects having a single namespace identifier for multiple cloud environments having different cloud identifiers.

12. The non-transitory computer-readable medium of claim 11 wherein data to be used for training is stored externally to the computing environment.

13. The non-transitory computer-readable medium of claim 11 wherein the multiple different operating environments function within a system that provides a multitenant database that stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

14. The non-transitory computer-readable medium of claim 11 wherein at least one of the data modeling projects provides at least a suggested classification with associated degree of confidence.

15. The non-transitory computer-readable medium of claim 11 wherein the data modeling services function on data acquired from disparate heterogeneous cloud sources.

* * * * *